July 21, 1959 S. G. COHEN 2,895,783

DATA CORRELATOR

Filed March 18, 1957 3 Sheets-Sheet 1

INVENTOR.
SAMUEL G. COHEN

BY H. L. Mackey

ATTORNEY

July 21, 1959 S. G. COHEN 2,895,783

DATA CORRELATOR

Filed March 18, 1957 3 Sheets-Sheet 2

INVENTOR.
SAMUEL G. COHEN

BY H. L. Murphy

ATTORNEY

July 21, 1959 S. G. COHEN 2,895,783

DATA CORRELATOR

Filed March 18, 1957 3 Sheets-Sheet 3

INVENTOR.
SAMUEL G. COHEN
BY
ATTORNEY 2,895,783

DATA CORRELATOR

Samuel G. Cohen, Ossining, N.Y., assignor to General Precision Laboratory Incorporated, a corporation of New York Application March 18, 1957, Serial No. 646,778

3 Claims. (Cl. 346—23)

This invention relates to devices for applying identifying signals to two or more data recorders recording the same data simultaneously, so that a datum on the record of any recorder can be identified on the record of any other recorder. More specifically, this invention is applicable to the simultaneous serial marking for identification of records of a plurality of recorders of which one is a periodical digital record in punched card form and one is a continuous graphical record on chart paper.

As an example of one use of this data correlator, consider an instrument under a test involving several continuous measurements. The results of these measurements are to be recorded during the test and analyzed later. It is desired to record all measurements periodically in digital form on punch cards providing records of high accuracy which are sufficient for quasi-static data. Later analyses of those cards can be expeditiously made by machines. It is, however, also desired to record all of these same data simultaneously in continuous graphs. These graphic records will depict variations occurring in the between-card intervals, and will depict frequencies too high for punch card recording at the card interval employed.

This duplicate recording of data poses the problem of correlation when analyzing the records. If a question arises about a card record, and the graph simultaneously recorded is referred to, there must be a positive identification of the point on the graph which represents the card data. This invention provides this positive identification.

Identification is effected in this invention by generating a series of signals representing serial numbers. These signals are transformed and transmitted to the card punch machine to serialize the cards by digit punches. The same serial signals are also transformed in another manner and are transmitted to the graph tracing instrument. There the signals generate easily identifiable lateral marks on the graph, each set of marks being easily identified as representing a serial number, this serial number being the same as the simultaneously punched digitized card serial number. This identity of serial numbers thus identifies the point on a data graph as representing the same data that is represented by the punched card.

The data correlator of this invention contains step switches which, by their positions at any instant, represent a serial number. Thus the movements of the step switches generate the series of serial numbers. In the example which is to be given the decimal system of numbers is employed, but within the framework of this invention any other base system could as well be employed.

The movements of the step switches generate two sets of signals. One set is decimal digital in nature, all digits of the serial number being simultaneously generated, and transmitted over parallel circuits to the card punch machine. The other set of signals is in the form of electrical current analogs of the serial number. In this form the serial number signal is transmitted to the graph tracing instrument where the signal is represented on the chart as a graphic analog of the applied current signal.

Circuits of the unbalanced bridge form are utilized to transform the step switch serial number into its current analog.

The principal purpose of this invention is to apply serial numbers simultaneously to a plurality of different types of data recorders for identification of corresponding records.

Another purpose of this invention is to apply a serial number in digital form to a digital recorder and simultaneously to apply the same serial number in analog form to an analog recorder.

A further understanding of this invention may be secured from the detailed description of the associated drawings, in which.

Figure 1:
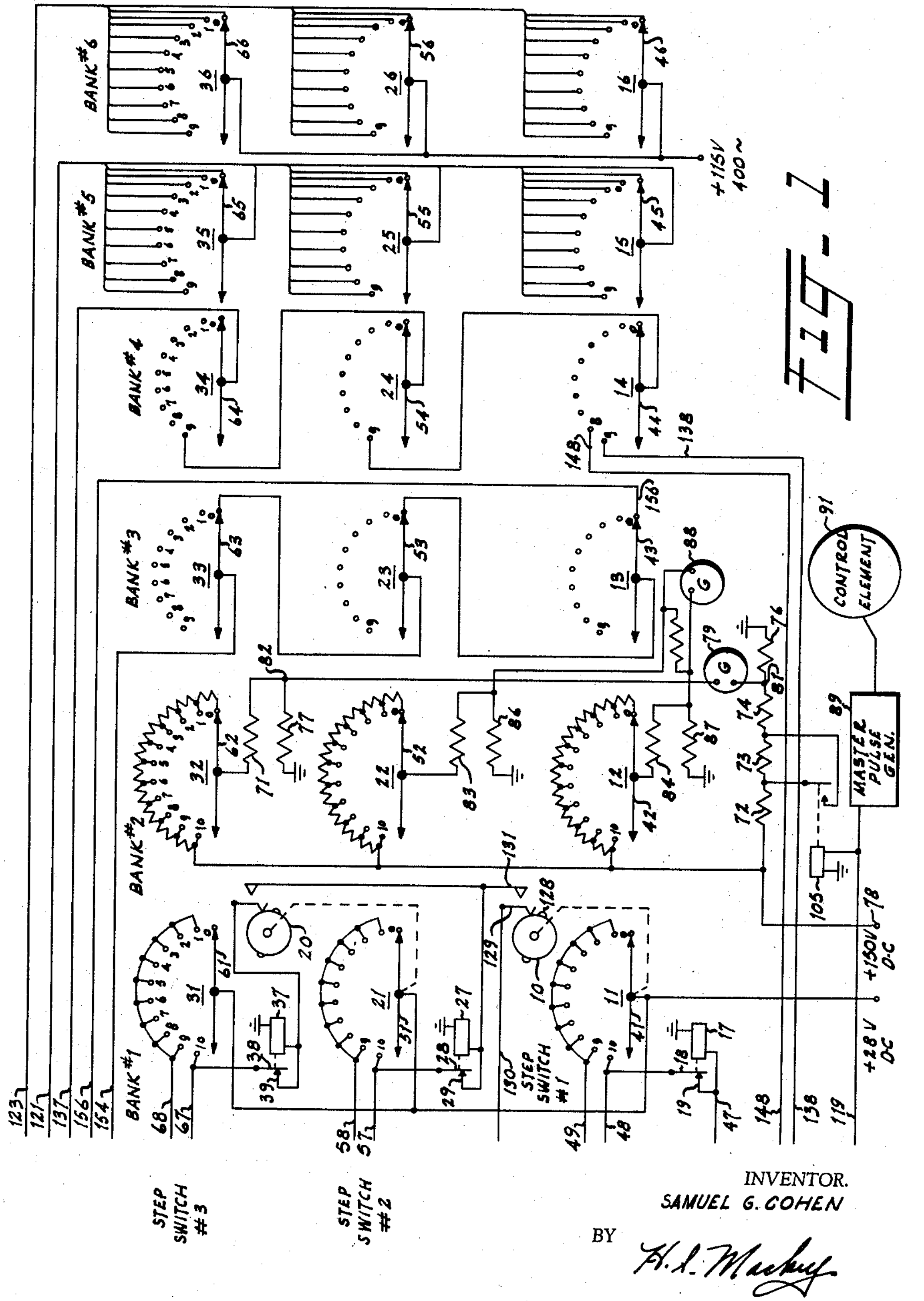
Figure 1 represents the wiring of three, six-bank step switches, together with elements of two measuring bridges and a master pulse generator.

Referring now to Fig. 1, step switch number one has six banks of contacts which are depicted as contact arcs numbered from left to right 11, 12, 13, 14, 15 and 16. The contacts in each bank are numbered from right to left, banks 11 and 12 each having eleven contacts numbered from 0 to 10 inclusive and banks 13, 14, 15 and 16 each having ten contacts numbered from 0 to 9 inclusive. At any position like-numbered contacts of the six banks are contacted by the six arms 41, 42, 43, 44, 45 and 46. Each arm is provided with dual contact wipers or brushes 180° apart and all arms rotate counterclockwise in concert. When the switch is at contact 0, as depicted, the opposed wiper is at the contact position next beyond contact position 10, at which there is no contact point. The step switch is provided with an operated solenoid 17 having an armature 18 and normally-closed contact 19. The step switch is also provided with a cam 10 which is secured to the wiper arm shaft and rotates with it.

Step switch number two is represented by the middle horizontal row of contact banks numbered 21, 22, 23, 24, 25, and 26, and by the associated arms 51, 52, 53, 54, 55, and 56, with associated operating solenoid 27, solenoid armature 28, contact 29, and cam 20. Step switch number three is represented by the top row of contact banks numbered 31, 32, 33, 34, 35 and 36, and by the associated arms 61, 62, 63, 64, 65 and 66, with associated operating solenoid 37, solenoid armature 38 and contact 39.

Since all of the step switches have eleven steps, in order to operate in the decimal system of numbers the first switch contact banks 11, 21 and 31 are connected so that the switches pass from contact 9 to contact 0 without stopping at contact 10. These banks also have the function of stepping the switches forward to zero under manual control.

The second banks 12, 22 and 32 constitute three 10-step rheostats, and with several fixed resistors constitute two bridges which convert the step switch positions into analogous current magnitudes indicated on two galvanometers. Contact bank 12 is the units bank, bank 22 is the tens bank and bank 32 is the hundreds bank. The hundreds bridge employs the bank 32 rheostat in series with resistor 71 as the principal adjustable arm. A second arm is composed of resistors 72, 73 and 74 in series. Resistor 76 constitutes a third arm and resistor 77 constitutes the fourth arm. A grounded positive potential source represented by terminal 78 is connected to resistor 72 and bank 32, with resistors 76 and 77 grounded, and a galvanometer 79 is connected between junctions 81 and 82.

The second bridge has two adjustable arms, being the rheostats of banks 12 and 22 with fixed resistors 83 and 84. Resistors 86 and 87 constitute the other two arms, connected to a shunted galvanometer 88.

The third banks 13, 23 and 33 of the three stepping switches and also the fourth banks 14, 24 and 34 function when the series of numbers attains the serial number 1999 to return the instrument to 0000. The fifth banks 15, 25 and 35 to be described later, control the serializing of the punched cards. The sixth banks 16, 26 and 36 control the operation of a lamp bank which indicates the current serial number.

The three step switches are identical and operate identically except that step switch number three does not have a cam.

Operation of step switch number one is effected by energizing its operating solenoid 17, then deenergizing it. Upon deenergization the switch steps counterclockwise one step. The operating solenoid 17 may be energized by applying direct potential to its terminal conductor 47 directly, in which case the termination of a single pulse input steps the switch forward a single step. Alternatively, the operating solenoid 17 may be energized by applying direct potential to its contact armature 18 through conductor 48, for example, in which case the solenoid rapidly attracts and releases armature 18, breaking and making its own circuit and stepping the switch forward one step at each break.

A master pulse generator 89 is provided to initiate each cycle of operations of the instrument of this invention. This generator 89 emits a train of pulses which, for example, may have a duration of 25 milliseconds and have a period within the range of 1 to 30 seconds or more. The master pulse generator is in turn controlled in any desired manner, the circle 91 representing this control element. A simple control element consists of a stable oscillator emitting pulses at 10-second intervals.

Figure 2:
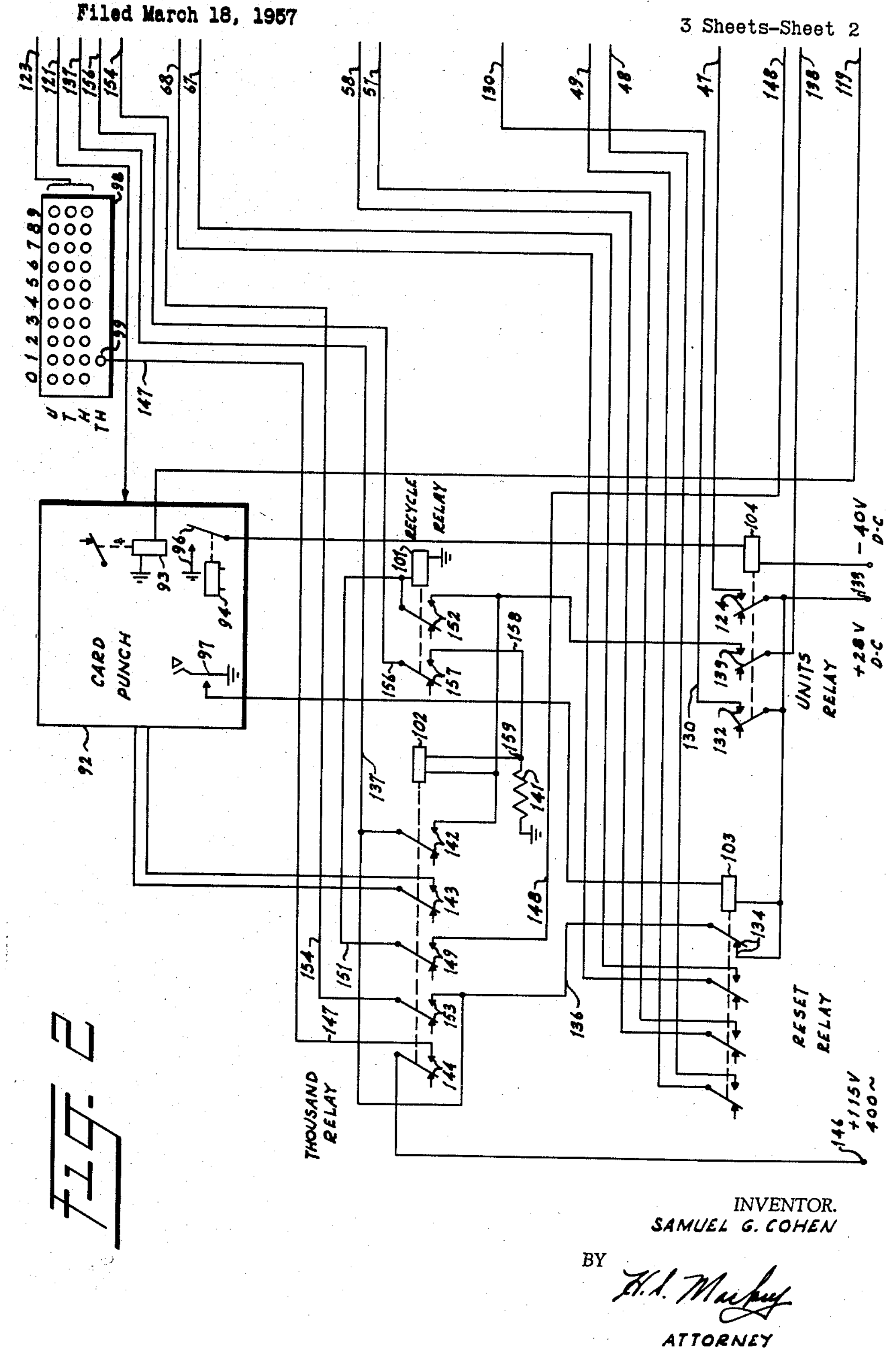
Figure 2 represents the wiring of four relays which together with the components of Figure 1 compose the data correlator.

A card punch controlled by the data correlator is indicated by a rectangle 92, Fig. 2. This card punch may be almost any one of several card punches available in the market, an example of a suitable card punch being the card punch #517 made by the International Business Machines Company. The card punch responds to decimal digital pulses applied to the punch through a group of conductors, there being one conductor fo reach digit in each place in the number transmitted. The card punch has a capacity of 2000 cards and the ability to translate number pulses in the series 0–1999 into digital card punches. The card punch is started by operation of a starting relay 93, and at the termination of each complete single card punch operation transmits a 50 ms. "clear" pulse by energizing relay 94 to close its contacts 96. A manual switch 97 is provided for resetting the data correlator to zero.

A bank of neon lamps 98 contains three rows of ten lamps each representing digits in the units, tens and hundreds places and a single additional lamp 99 representing unity in the thousands place.

Five relays form part of the data correlator. They are:

A recycle relay comprises solenoid 101 and two normally-open contacts. This relay functions when the serial number changes from 1999 to 000.

A thousands relay comprises solenoid 102 and five normally-open contacts. During the count 000–999 this relay remains unoperated or normal, with its solenoid unenergized. During the count 1000–1999 this relay remains operated.

A reset relay comprises solenoid 103, three normally-open contacts and one normally closed contact. This relay has as its only function the resetting of the data correlator from any position to 000 under control of the manual key 97 in the card punch.

A units relay comprises solenoid 104 and three normally open contacts. It operates and releases each time that the card punch completes a punch operation.

A marking relay comprises solenoid 105, Fig. 1, and a single, normally-open contact. The function of this relay is to mark the hundreds graph once for each serial number to facilitate serial identification of the graph data.

The above generally described components, grouped as step switches, relays, resistors, and a master pulse generator, constitute the data correlator. It applies serial number signals to two devices. One, the card punch, is generally indicated by the rectangle 92, Fig. 2. The other, the graph-drawing instrument, may be of the form generally termed an oscillograph. One available and well-known oscillograph optically draws 24 graphs on sensitized photographic paper in accordance with 24 kinds of data signals received over 24 circuits. The data-receiving elements are galvanometers. Two of the 24 circuits with their two galvanometers are required for reception of the serial number signals. The entire oscillograph is not depicted in the drawings, but the two galvanometers connected to the data correlator are schematically indicated at 79 and 88, Fig. 1, as mentioned. It is preferred that the two curves drawn by these galvanometers be at or near opposite edges of the wide roll of sensitized oscillograph paper, the hundreds curve near one edge and the units and tens curve near the other edge, with most or all of the data curves lying between them.

Figure 3:
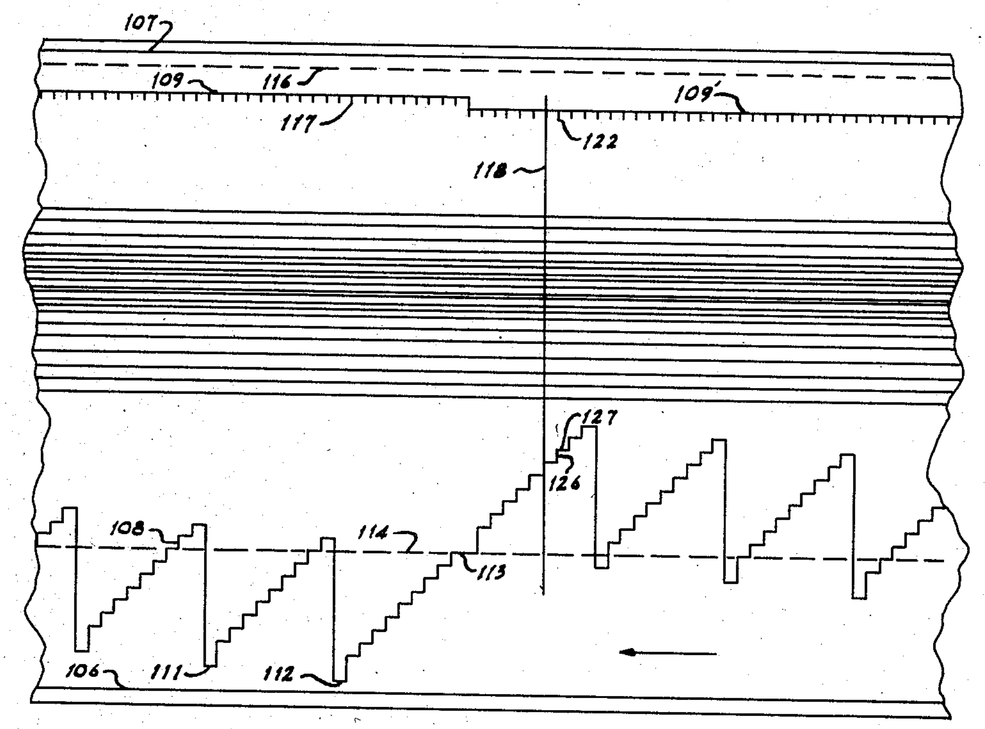
Figure 3 represents a section of a chart upon which data graphs and graphic representations of serial numbers have been drawn by a graph drawing instrument such as may be associated with the data correlator.

Figure 3 illustrates the appearance of the oscillograph record. Traces 106 and 107 form border lines from which measurements can be made. Trace 108 is the graph made by the units and tens signal generator of the data correlator and trace 109 is the graph made by the hundreds signal generator. The 20 straight lines between the two latter traces represent the data traces drawn by the 20 remaining oscillograph elements in accordance with data received over 20 circuits from various sources.

The units and tens curve 108 is composed of groups of sawtooth or "staircase" figures. Each such staircase has nine risers and ten treads. The ten treads represent the ten digits, 0 to 9, in the units place, the lowermost or floor tread representing 0. Zero is further identified by the fact that the riser between 0 and 1 is twice the height of the other risers. The lateral position of a selected tread relative to the zero tread thus designates a specific units digit. The position of the 0 tread, such as tread 111, relative to the border line 106 indicates the digit in the tens place. The position of tread 111 indicates 8 in the tens place, tread 112 indicates 9, being one unit closer to border line 106, and tread 113 indicates 0, being 9 positions or units higher than tread 112. The horizontal position represented by the dashed line 114 thus is the zero datum line for the serial number tens place. The units and tens place digits of any decimally-expressed serial number may accordingly be identified by a longitudinal position on curve 108.

The hundreds curve 109 is composed of a longitudinal line having at any point one of ten positions relative to the border line 107. The dashed line 116 represents the zero position, the position 109 represents the digit two and the position 109′, one unit further than position 109 from the border line 107, represents the digit 3 in the hundreds place. The short marks 117 on the hundreds trace 109 occurs at each longitudinal position corresponding to a riser in trace 108. The function of these marks 117 is to facilitate identification of longitudinal position and of time corresponding thereto along any of the 20 data traces. This identification is effected, in analyzing the graphs, by laying a straightedge across the graph paper between a staircase riser and the corresponding mark on the hundreds trace. The points on the 20 data graphs cut by the strightedge are then identified by the provisions of the straightedge on curves 108 and 109.

For example, assuming the paper moves from right to left, if the line 118 be drawn by the straightedge, the hundreds digit is 3, the tens digit is 0 and the unit digit is 6. Therefore all points on the 20 data graphs cut by line 118 are identified by the serial number 306.

It is to be understood that the longitudinal distances on the graph paper corresponding to intervals between single card punch cycles are represented by the lengths of the treads of curve 108. These lengths are depicted as short and equal, as would be the case if the graph paper speed were constant and the control element 91, Fig. 1, were a timing element with short constant periods. The control element may, however, operate otherwise, so that the treads of curve 108, Fig. 3, may be neither short nor equal in length.

The general sequence of serializing operations is as follows. Control element 91, Fig. 1, emits a pulse, triggering the master pulse generator 89, which emits a 25 ms. pulse. This pulse is applied through conductor 119 to the card punch 92, Fig. 2, where it closes the card punch starting relay 93, starting the card punch operation. This card punch operation consumes less than one-half second. It punches data indicia in a card as received from various sources by circuits which are not indicated in the drawing. It also punches a serial number, for example number 306, in the card in accordance with circuits through banks 15, 25 and 35, Fig. 1, transmitted through conductor cable 121 to the card punch. At the same time the masted pulse generator 89 transmits its pulse to marking relay 105, which short-circuits resistor 73 for the 25 ms. duration of the pulse, then releases. Since resistor 73 is in one leg of the hundreds bridge, this causes the oscillograph hundreds curve element to make a short, momentary excursion, drawing one of the marks 117, Fig. 3. At the end of the card punching operation of card punch 92, Fig. 2, clear pulse relay 94 closes momentarily, transmitting a 50 ms. clear pulse to the data correlator relay circuit and causing that circuit and the step switch circuits to advance by one serial number. This causes a riser to be drawn in the graph 108, Fig. 3, advancing the serial number by one. The data correlator and the card punch are then quiescent until the next operation or cycle is initiated by the control element 91, Fig. 1.

Operation of the data correlator relay and step switch circuits in advancing as referred to above is as follows. Let it be supposed that the step switch banks rest on contacts representing the serial number 306. Switch number one, Fig. 1, then rests on bank contacts 6, switch number two rests on contacts 0, and switch number three on contacts 3. The last card was punched by card punch 92, Fig. 2, with decimal punches representing serial number 305, and the last riser shown on graph 108, Fig. 3, and the last mark or cusp on graph 109, were as indicated by line 118.

A control element pulse initiates a master generator pulse, operating relay 105 and marking hundreds cusp 122 on the paper. The card punch operates, punching a card with number 306 since banks 15, 25 and 35 are positioned to transmit number 306. Banks 16, 26 and 36 also are thus positioned, closing circuits through cable 123 to lamp bank 98 and lighting hundreds lamp 3, this lamp 0 and units lamp 6. At the end of the punch operation punch relay contacts 96 close momentarily, momentarily operating relay 104. Relay 104 contacts 124 close and apply current through conductor 47 to step switch solenoid 17, which operates. At the end of the 50 ms. operation of relay 94, contacts 96 open, releasing relay 104 and solenoid 17. This release steps switch number one forward one step to contacts number seven. This advances the positions of banks 15 and 16 to the 7 digit, so that the positions of the three step switches now represent the serial number 307. The change in bank 12, by changing its bridge unbalance changes the position of galvanometer 88. This change draws the riser 126 in curve 108, increasing the curve to the 07 level represented by tread 127.

If the serial number before an operation is 309 and the serialing operation advances the number to 310, the operation is the same with this addition. When bank 11 moved from contact 8 to contact 9 the cam 10 also moved so that its rise 128 raised the spring follower 129, closing contacts 131. Upon the next operation or relay 104, applying power to step switch number one solenoid 17, power is also applied through contacts 132 of relay 104, and conductor 130, and contacts 131 to solenoid 27 of step switch number two. Upon release of relay 104 step switch 32 as well as step switch number one steps forward one digit.

If the serial number before an operation ends in 99, cam 20 similarly operates to step switch number three forward one step.

In this example the serial number representation capacity of the oscillograph is limited to 999, while the card punch serial capacity is 1999 and the lamp bank capacity is also 1999. In order to apply a special signal representing digit 1 in the thousands place during the serials 1000–1999, relay 102 is provided. It is normal during the transmission of serial numbers 0–999 and is kept energized during transmission of numbers 1000–1999. Its operation is as follows. When all three step switches rest on step 9, representing serial number 999, a circuit is made from 28-volt terminal 133 through normal contacts 134 of relay 103, conductors 136 and 137, the "9" contacts of banks 34, 24 and 14, and through conductor 138 to normal relay 104, where the circuit is interrupted. No further action occurs at this time. When, however, the 1000th clear pulse is transmitted from the card punch to relay 104, its contacts 139 close, applying power through relay solenoid 102 and resistor 141 to ground. Relay 102 closes and locks through contacts 142. Relay 102 contacts 143 close, transmitting a signal to card punch 92 causing it to punch 1 in the thousands place in ensuing operations. Relay 102 contacts 144 close, applying power from terminal 146 to conductor 147 and to the thousands lamp 99 in lamp bank 98.

In order to release the thousands relay 102 at the end of the second thousand of serial numbers, the following action takes place. At the serial number 1998 bank 34 is at 9, bank 24 is at 9 and bank 14 is at 8. This completes a circuit from 28-volt terminal 133 through contacts 134, conductor 136, conductor 137, banks 34, 24 and 14, conductor 148, relay 102, contacts 149, conductor 151 and relay solenoid 101 to ground. Recycle relay 101 closes and locks through contacts 152. Nothing happens at the 1999th pulse. On the next or zeroeth pulse, when the step switch banks rest on 999, the three step switch solenoids 17, 27 and 37 are operated. At the end of the pulse, relay 104 releases, releasing solenoids 17, 27 and 37 and the three switches step to 000. The banks 13, 23, and 33 complete a circuit, starting at battery terminal 133, through contacts 134, conductor 136, relay 102, contacts 153, conductor 154, banks 33, 23 and 13, conductor 156, relay 101, contacts 157 and conductor 158 to the ground terminal 159 of relay solenoid 102. This shunts relay 102, releasing it. This opens contacts 142 releasing relay 101. The release of contacts 143 erases the thousands indication in the card punch and the opening of contacts 144 releases lamp 99.

What is claimed is:

1. A data correlator for correlating by serial numbering two data recorders emitting graphic and punched card records respectively of identical data comprising, a master pulse generator emitting pulses, means starting a cycle of said punched card data recorder from a pulse emitted by said master pulse generator, a serial number generator for generating signals representing a serial number, means starting said serial number generator under control of said punched card data recorder to generate a selected serial number, means applying a signal generated by said serial number generator to said punched card data recorder whereby it digitally punches said selected serial number in a card, and means substantially simultaneously applying a signal generated by said serial number generator to said graphic data recorder whereby it draws graphic indicia which together are an analog of said selected serial number.

2. A data correlator for correlating by serial numbering two data recorders emitting graphic and punched card records respectively of identical data continuously and simultaneously applied thereto comprising, a master pulse generator, electrical connecting means starting a punch operation of said punched card data recorder from a pulse of said master pulse generator, a serial number generator for generating electrical signals representing serial numbers, electrical connecting means applying a pulse emitted by said punched card data recorder at the end of its punch operation to said serial number generator to initiate the generation of electrical signals representing a selected serial number, electrical connecting means applying one group of said electrical signals to said punched card data recorder whereby it punches digital indicia representing said selected serial number, and electrical connecting means operating substantially simultaneously applying another group of said electrical signals to said graphic data recorder whereby it draws graphic indicia analogously representing said selected serial number.

3. A data correlator for correlating by serial numbering two data recorders comprising, an oscillograph continuously receiving and continuously graphically recording curves of data, a card punch continuously receiving and digitally recording on cards at intervals the same data, said card punch having a starting relay and a terminal-pulse-generating relay, a master pulse generator generating master pulses, an electrical connection from said master pulse generator to said card punch starting relay whereby a master pulse starts a punch operation of said card punch, a serial number generator generating electrical signals representing serial numbers, an electrical connection from said terminal-pulse-generating relay to said serial number generator whereby a terminal pulse advances said serial number generator by one least whole number and whereby the serial number generator emits at least two groups of electrical signals representative of a selected serial number, electrical connections between said serial number generator and said card punch whereby one of said two groups of electrical signals is applied to said card punch causing digital indicia representative of said selected serial number to be applied to a card, and electrical connections between said serial number generator and said oscillograph whereby the other of said two groups of electrical signals is applied to said oscillograph causing graphic indicia representative of said selected serial number to be inscribed.

References Cited in the file of this patent

UNITED STATES PATENTS

| | | |
|---|---|---|
| 2,074,006 | Pein | Mar. 16, 1937 |
| 2,540,654 | Cohen et al. | Feb. 6, 1951 |
| 2,567,134 | Stuivenberg | Sept. 4, 1951 |
| 2,610,226 | Klaase et al. | Sept. 9, 1952 |

FOREIGN PATENTS

| | | |
|---|---|---|
| 940,006 | France | Dec. 1, 1948 |